(12) United States Patent
Harden et al.

(10) Patent No.: US 6,431,572 B1
(45) Date of Patent: Aug. 13, 2002

(54) WHEELCHAIR SAFETY LOCK

(76) Inventors: Jerrell William Harden; Russell Jerrell Harden, both of RR 1, Box 227, Banks, AL (US) 36005

( * ) Notice: Subject to any disclaimer, the term of this patent is extended or adjusted under 35 U.S.C. 154(b) by 0 days.

(21) Appl. No.: 09/973,874

(22) Filed: Oct. 11, 2001

(51) Int. Cl.$^7$ .................. B62M 1/14; B60K 28/00
(52) U.S. Cl. .............. 280/250.1; 280/304.1; 297/DIG. 4; 188/2 F; 180/272
(58) Field of Search .............. 280/250.1, 304.1, 280/242.1; 188/2 F, 74, 265; 297/DIG. 4, 115, 116; 180/271, 272

(56) References Cited

U.S. PATENT DOCUMENTS

| | | |
|---|---|---|
| 3,301,574 A | 1/1967 | Good |
| 4,268,054 A | 5/1981 | Twitchell et al. |
| 4,322,093 A | 3/1982 | Otto |
| 4,350,227 A | 9/1982 | Knoche |
| 4,805,931 A | 2/1989 | Slasor |
| 4,865,344 A | 9/1989 | Romero, Sr. et al. |
| 5,020,815 A | 6/1991 | Harris et al. |
| 5,174,418 A | 12/1992 | Le et al. |
| 5,232,236 A | 8/1993 | Korpi |
| 5,242,179 A | 9/1993 | Beddome et al. |
| 5,941,547 A | 8/1999 | Drake |
| 6,182,781 B1 * | 2/2001 | Beom .................. 180/272 |
| 6,298,937 B1 * | 10/2001 | Beom .................. 180/272 |

* cited by examiner

*Primary Examiner*—Anne Marie Boehler
*Assistant Examiner*—Matthew Luby
(74) *Attorney, Agent, or Firm*—Sterne, Kessler, Goldstein & Fox P.L.L.C.

(57) ABSTRACT

A wheelchair safety lock with a safety handle that is positioned such that the user of the wheelchair cannot enter or exit the wheelchair without moving the safety handle out of the way. When the safety handle is moved out of the way, the brake of the wheelchair is engaged against the wheels of the wheelchair. In order to operate the wheelchair, the safety handle is moved back into position after the user is seated. The safety handle extends in front of the user above the users lap when the user. is seated in the wheelchair. Therefore, the user cannot exit the wheelchair unless the safety handle is moved, thereby engaging the brake. Similarly, if the safety handle has been moved such that the brake is disengaged, the user can not enter the wheel chair because the safety handle is blocking the entrance. The safety handle must be moved in order to enter the wheelchair, thereby engaging the brake. The safety handle is also useful for the user to hold when declining a steep incline.

10 Claims, 5 Drawing Sheets

WHEELCHAIR SAFETY LOCK

CROSS-REFERENCE TO RELATED APPLICATIONS

Not applicable.

STATEMENT REGARDING FEDERALLY-SPONSORED RESEARCH AND DEVELOPMENT

Not applicable.

REFERENCE TO MICROFICHE APPENDIX/ SEQUENCE LISTING/TABLE/COMPUTER PROGRAM LISTING APPENDIX (submitted on a compact disc and an incorporation-by-reference of the material on the compact disc)

Not applicable.

BACKGROUND OF THE INVENTION

1. Field of the Invention

The present application relates to a safety lock for wheelchairs. In particular, it relates to a safety lock for wheelchairs that prevents the user from getting up from the wheelchair until the lock is engaged.

2. Background Art

Conventional wheel chairs typically include hand-operated brakes. These brakes engage the main drive wheels of the wheelchair and are applied by the user, or a helper, before the user is seated in the wheelchair so that the wheelchair is stabilized. The brakes are released by hand once the user is seated to operate the wheelchair. When the user wishes to leave the wheelchair, the brakes are reapplied by hand in order to stabilize the wheelchair. FIG. 1 shows a conventional wheelchair brake assembly. Conventional wheelchair brakes are often engaged when the user is going to be stationary for an extended period of time, the user is traveling in a train or other moving vehicle, or the user wants to get into or get out of the wheelchair.

A problem with wheelchairs with conventional hand operated brakes is that some users, typically elderly users, severely handicapped users, or users afflicted with Alzheimer's disease, often forget or are unable to lock the wheel chair prior to attempting to get into or out of the wheelchair. When the user attempts one of these operations, the wheelchair may roll, causing the user to fall and possibly injure themselves. An elderly user who falls down when attempting to get into or out of a wheelchair runs the risk of a broken hip, a common occurrence when elderly persons fall.

Some attempted solutions to the problem of users attempting to sit down in or get up from a wheelchair without engaging the brake include sensors located in the seat such that the lock is engaged at all times unless a sufficient amount of pressure (from the person's body weight) is applied against the seat of the wheel chair, mechanical locks that disengage by the force of weight from the person sitting in the chair, and brakes coupled to the arm rests of wheelchairs. These solutions do not adequately address the transition time when a person first attempts to get out of the wheel chair and their weight is still pressing against the seat of the wheel chair. The arm rest solution has the problem that the user may accidentally engage the brake when seated in the wheelchair by leaning on the arm rests. Further, in that solution, the brake must be disengaged by hand. Therefore, every time the user accidently or otherwise engages the brake by leaning on the arm rests, the brake must be disengaged by hand.

Another problem with conventional wheelchairs is that users, especially users that have difficulty controlling their movements, feel that they are going to fall out of the wheelchair when going down a steep decline. Handles/arm rests on wheelchairs are generally at the sides of the wheelchairs. Elderly or weakened users sometimes cannot support their weight by grasping the arm rests. Children using wheelchairs are also in danger of falling out of the wheelchair when going down a steep decline.

BRIEF SUMMARY OF THE INVENTION

The present invention provides a simple solution to the above mentioned problems by utilizing a safety handle that is coupled to the brake of the wheelchair. The safety handle is positioned such that in order for a user seated in the wheelchair to get out of the wheelchair, the safety handle must be moved such that the brakes engage against the tires of the wheelchair. In the preferred embodiment, the safety handle extends in front of the user seated in the wheelchair, just above the user's lap. In this position, the wheelchair brake is disengaged and the wheelchair can be moved. When the user desires to leave the wheelchair, he/she must move the safety handle because it is blocking the exit of the wheelchair. When the safety handle is moved, the wheelchair brake is engaged, thereby preventing the wheelchair from moving while the user is getting out of the wheelchair. Similarly, in order for the user to get into the wheelchair, the safety handle must be in the engaged position. This prevents a user from attempting to get into the wheelchair while the brake is disengaged.

The present invention can also be provided as a kit to be added to a conventional wheelchair. This reduces costs of the safety feature by allowing a user to add on the safety handle to a conventional wheelchair.

BRIEF DESCRIPTION OF THE DRAWINGS/ FIGURES

The present invention is described with reference to the accompanying drawings.

DETAILED DESCRIPTION OF THE INVENTION

Preferred embodiments of the present invention are now described with reference to the figures where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the invention.

Figure 1:
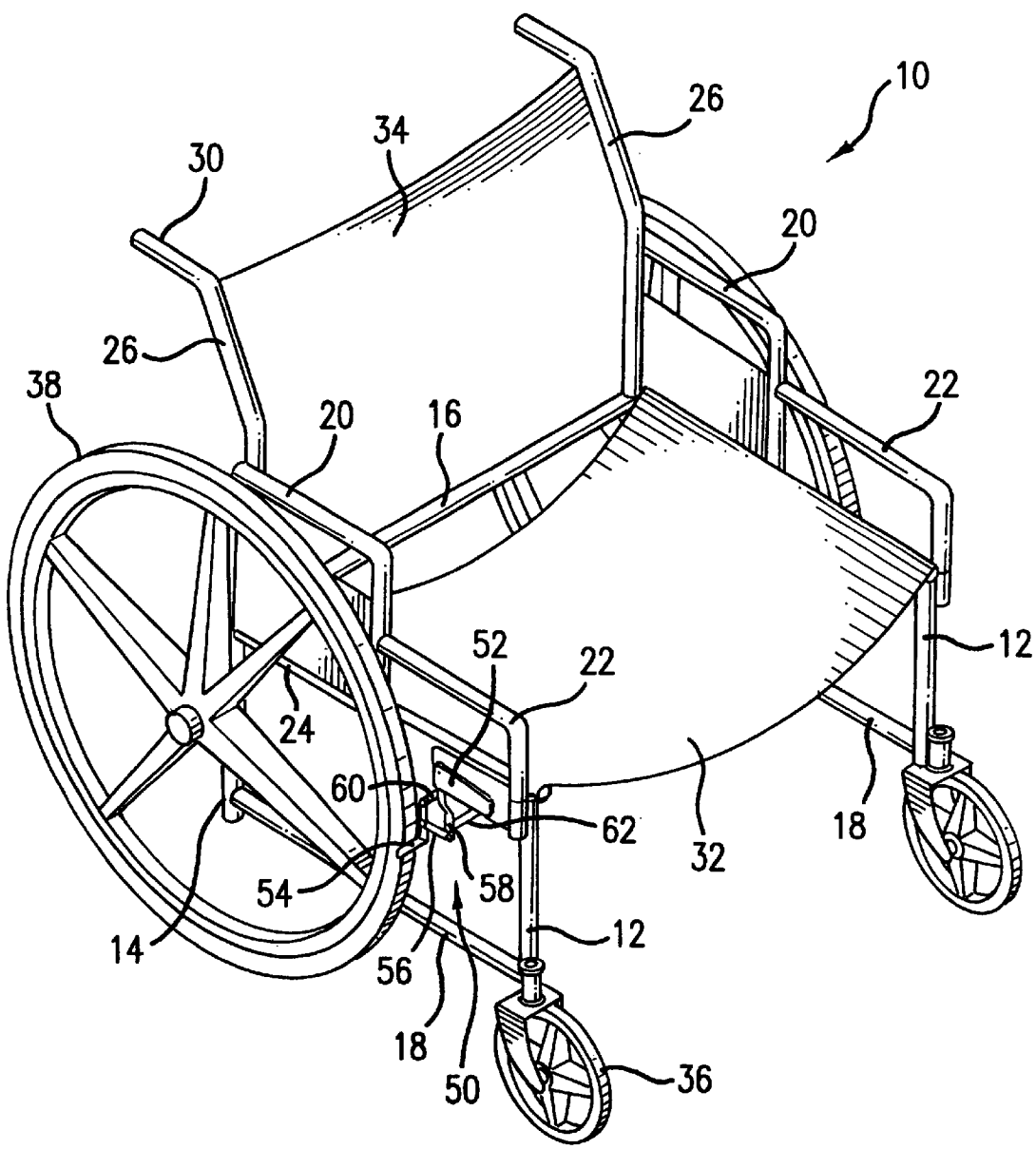
FIG. 1 is a perspective view of a conventional wheelchair with a conventional hand operated brake assembly.

FIG. 1 shows a conventional wheelchair 10 with a hand operated brake assembly 50. Wheelchair 10 includes frames on each side of wheelchair 10. The frames include front and rear vertical members 12 and 14. Longitudinal members between front and rear vertical members 12 and 14 include a lower horizontal member 18, an intermediate horizontal member 24, an arm rest frame member 20, and an upper horizontal member 22. Back support frame members 26 extend upwardly from rear vertical members 14, ending in push handles 30. Front wheels 36 are supported on front vertical members 12. Seat 32 is supported between intermediate horizontal members 24. Back support 34 is supported between back support frame members 20. Frame member 16 extends between the left and right sides of wheelchair 10. Conventional brake assembly 50 comprises a brake 54 for applying a friction force against main driving wheels 38, a brake handle 52, and interconnecting links 56 and 58. Pins 60 and 62 support brake 54 and link 58 to intermediate horizontal member 24, respectively. In operation, when brake handle 52 is lowered, brake 54 engages against driving wheel 38. When brake handle 52 is raised, brake 54 disengages from driving wheel 38.

Figure 2:
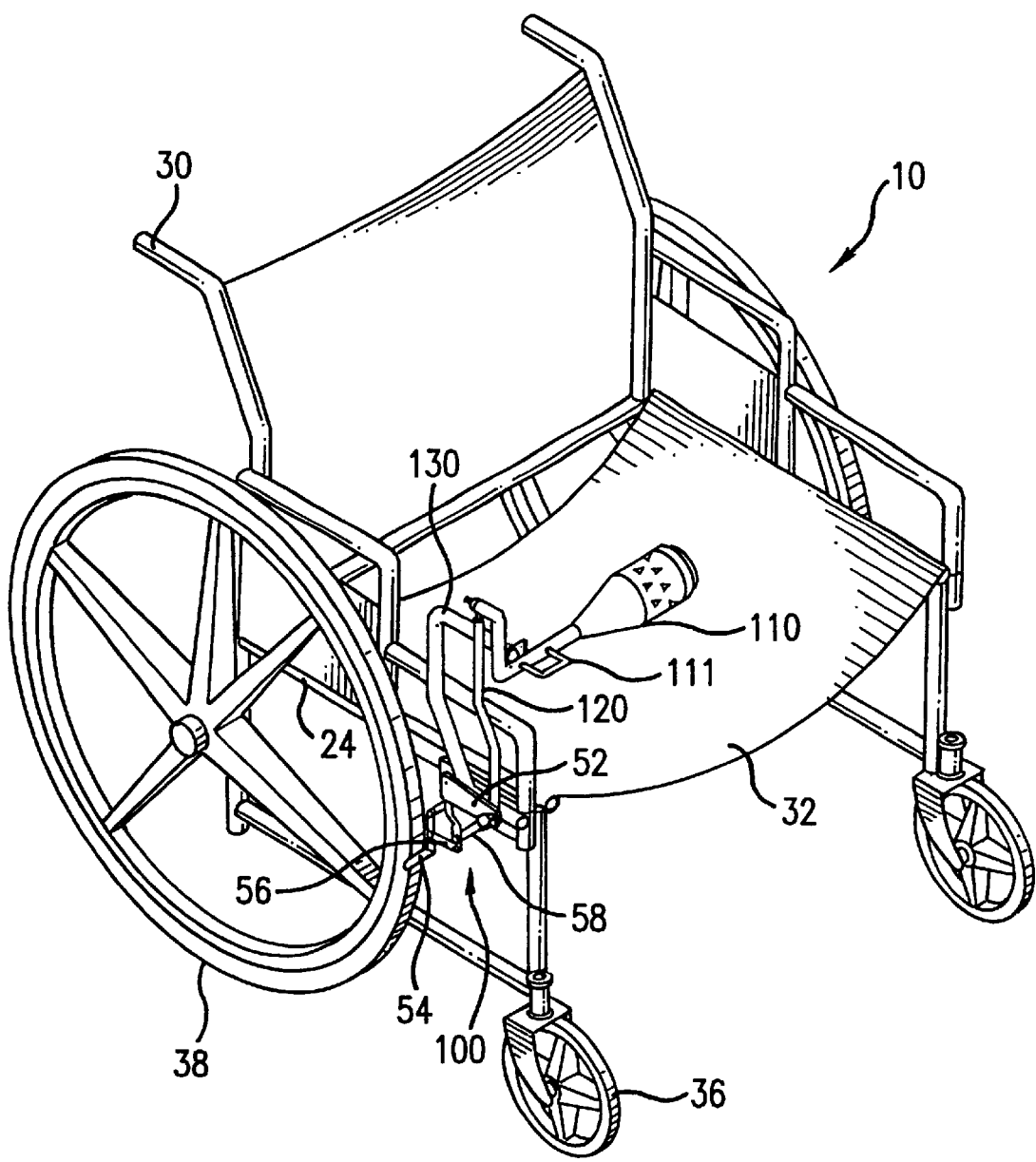
FIG. 2 is a perspective view of a wheelchair equipped with the safety lock assembly of the present invention.

A preferred embodiment of the wheelchair safety lock of the present invention is shown in FIG. 2. FIG. 2 shows a wheelchair 10 including the same general features as conventional wheelchair 10 shown in FIG. 1. The safety lock assembly 100 of wheelchair 10 of the present invention includes a safety handle 110 coupled to brake 54 through a link 120, brake handle 52, and links 58 and 56. Safety handle 110 is positioned in front of the user such that the user cannot sit in or get up from wheelchair 10 without moving safety handle 110 out of the way. When safety handle 110 is moved to permit the user to sit in or get up from wheelchair 10, brake 54 engages against main driving wheel 38 of wheelchair 10.

Figure 3:
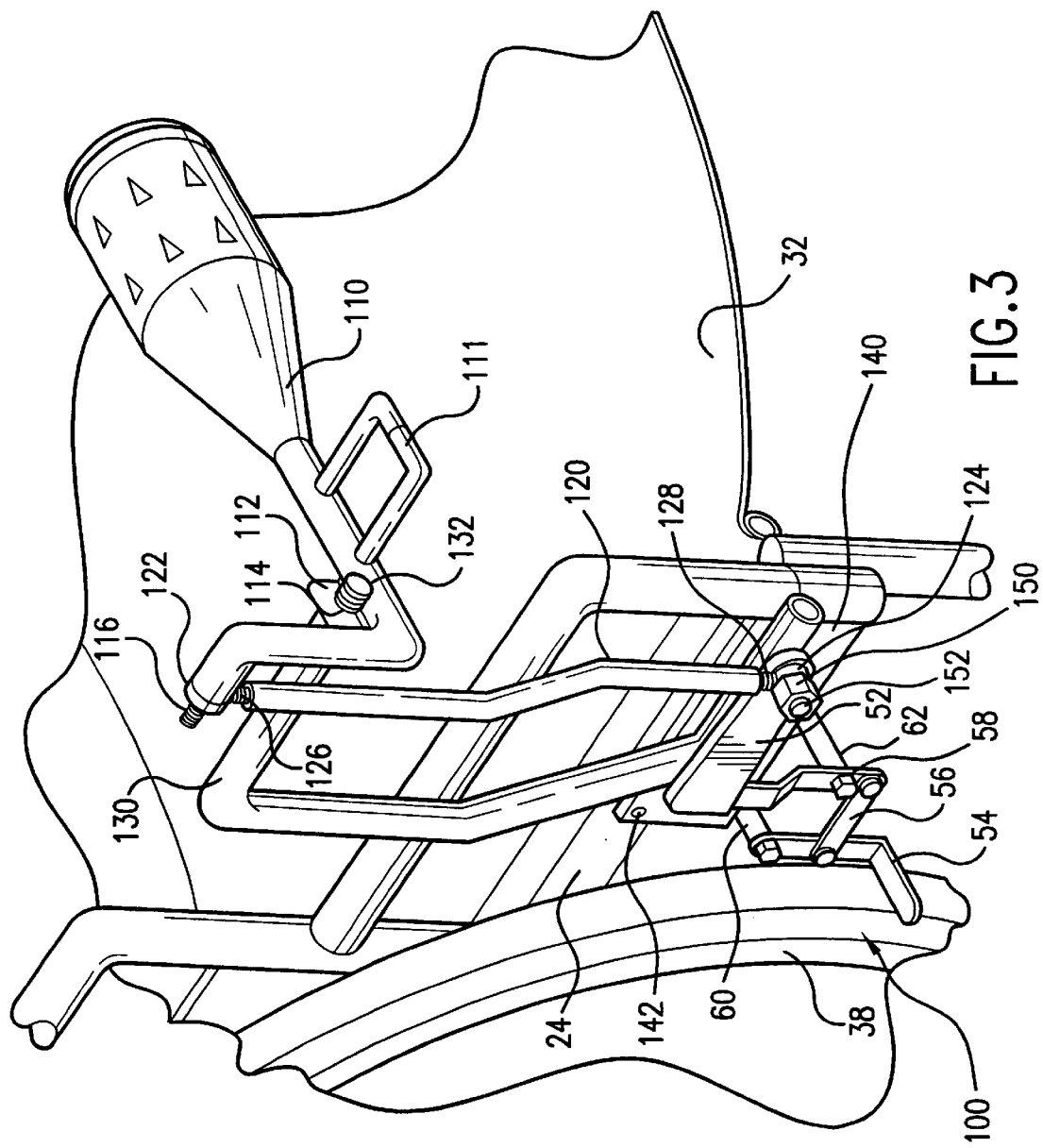
FIG. 3 is a closer perspective view of the safety lock assembly of the present invention mounted on a wheelchair, with the safety handle in a position such that the brake is disengaged.

FIG. 3 provides a more detailed view of safety lock assembly 100 of the present invention. Safety handle 110 is coupled to a stationary rod 130 such that safety handle 110 rotates about the coupling point. This coupling can be through an extension 112 in safety handle 110 that includes a hole 114. Hole 114 may be threaded and coupled to a threaded end 132 of stationary rod 130, as shown in FIG. 3. Other similar coupling arrangements may be used. For example, hole 114 need not be threaded and may simply be inserted over an end of stationary rod 130, with a cap or other means to prevent hole 114 from slipping off the end of stationary rod 130. Stationary rod 130 is coupled to wheelchair 10, for example, through a mounting plate 140 mounted to intermediate horizontal frame member 24, such that stationary rod 130 is prevented from moving relative to wheelchair 10. Although mounting plate 140 is shown mounted to intermediate horizontal frame member 24, it could also be mounted to other frame members of wheelchair 10. Safety handle 110 may optionally be provided with a loop 111, as shown in FIG. 3. Loop 111 will be explained in more detail below.

As also shown in FIG. 3, link 120 is coupled to brake 54 through brake handle 52 and links 56 and 58. Link 120 is coupled to brake handle 52 using a nut 150. The connection between link 120 and brake handle 54 is such that brake handle 54 can rotate about link 120 as it is be pushed by the movement of link 120. Preferably link 120 includes a loop or hole 124 such that a rod 152 extending from brake handle 50 extends through loop 124. Link 120 is held in position by nut 150. Similarly, link 120 is coupled to safety handle 110, preferably through a hole or loop 122 at the other end of link 120. Safety handle 110 preferably includes a threaded end 116 that extends through hole or loop 122 in link 120. Safety handle 110 can be coupled to link 120 in other ways, as discussed above with respect to safety handle 110 and stationary rod 130.

Figure 4:
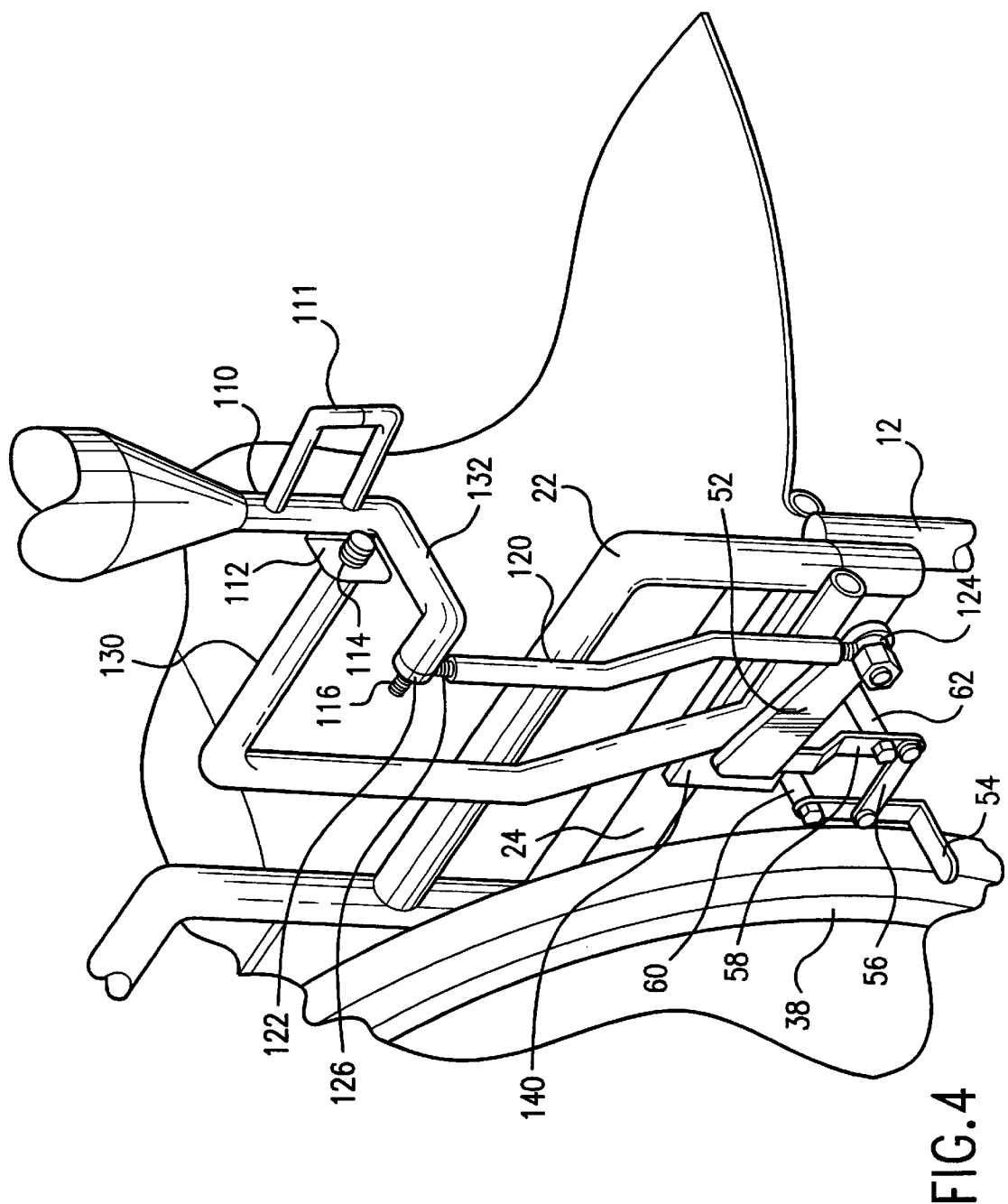
FIG. 4 is a closer perspective view of the safety lock assembly of the present invention mounted on a wheelchair, with the safety handle in a position such that the brake is engaged.

In operation, when safety handle 110 is moved out of the way of the user sitting in wheelchair 10, safety handle 110 rotates around stationary rod 130. The upward movement of the portion of safety handle 110 in front of the user sitting in wheelchair 10 translates into a downward movement of end 116 of safety handle 110. This downward movement pushes link 120 downward. Link 120 correspondingly pushes an end of brake handle 52 downward. The movement of brake handle 52 causes brake 54 to move against wheels 38. The friction between brake 54 and wheel 38 prevents wheelchair 10 from moving, thereby allowing the user in wheelchair 10 to safely exit. FIG. 4 shows safety handle 110 in the position such that brake 54 is engaged.

As described above and shown in the Figures, there is only a single safety handle couple to one wheel of the wheelchair. In practice, a safety handle for each wheel of the wheelchair is preferable. Otherwise, when attempting to exit from the wheelchair, one of the wheels can still move, possibly resulting in the user losing his/her balance and injuring himself/herself.

In operation, safety handle 110 located in front of the user when seated in wheelchair 10 can be used as a support when descending a steep incline. It is easier for a user to hold his/her weight by pushing against safety handle 110 than holding onto an arm rest conventionally located on arm rest frame members 20 of wheelchair 10. Further, if wheelchair 10 is going too fast, safety handle 110 can be partially engaged to slow down wheelchair 10. Safety handle 110 can be used for other purposes as well. For example, loop 111 of safety handle 110 could be adapted such that a tray could be conveniently placed on it so that the user can eat in wheelchair 10. Further, when safety handle 110 is in its upright/locked position, the user can utilize loop 111 to stabilize himself/herself as he/she gets into wheelchair 10.

The safety lock assembly 100 described above is a retro-fit onto a conventional wheelchair 10. Less connections and parts may be utilized if a wheelchair is designed with a safety lock 100 that is not coupled to a conventional brake assembly 50 of wheelchair 10. In such a situation, the rotation of safety handle 110 can directly actuate brake 54 through link 120, rather than acting through brake handle 52. However, the retro-fit option is advantageous because safety lock assembly 100 can be added to conventional wheelchairs at minimal cost, rather than requiring purchase of an entire new wheelchair. Retro-fitting conventional wheel chairs can be accomplished through a kit, as described in more detail below.

Figure 5:
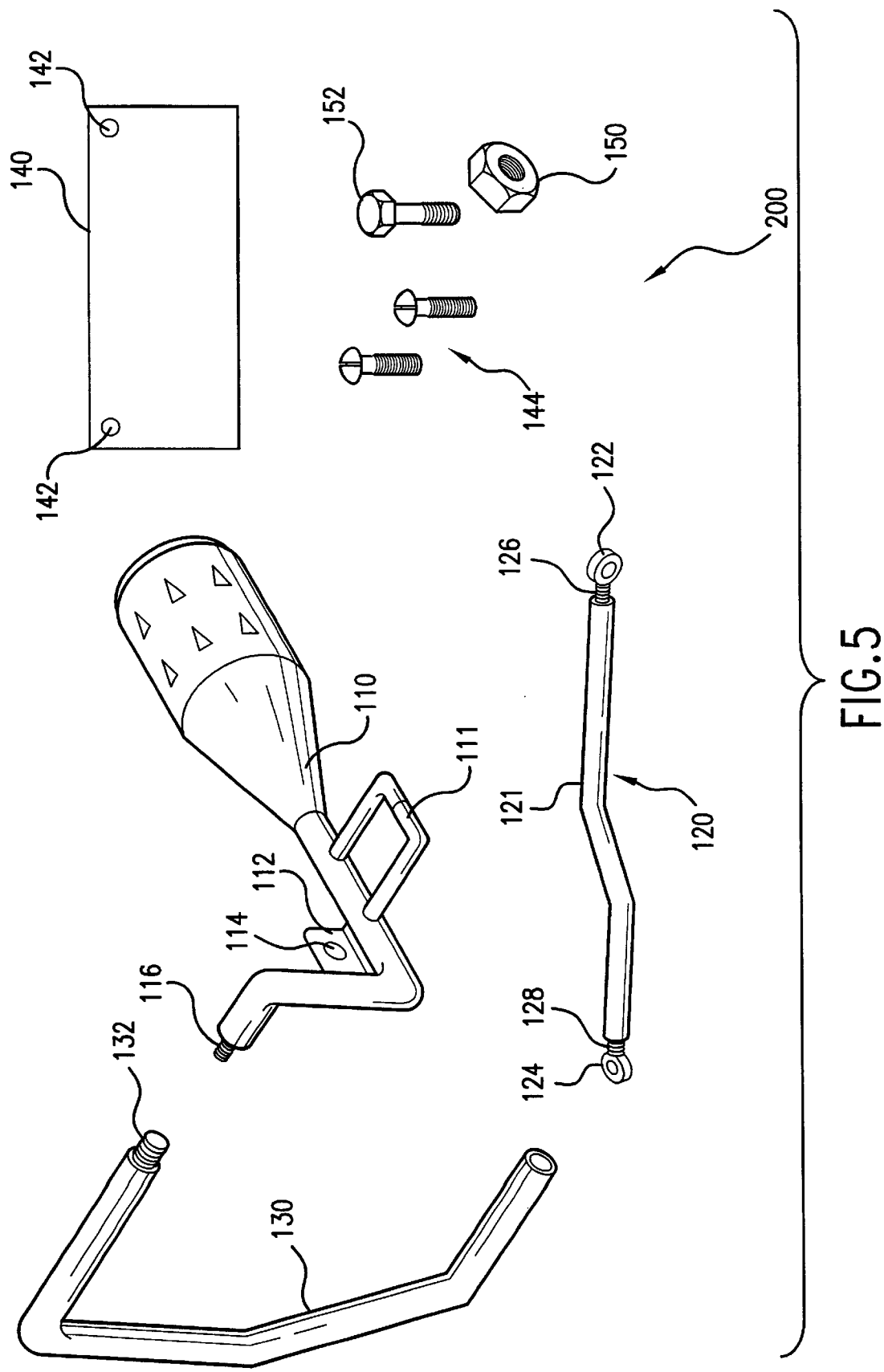
FIG. 5 is a perspective view of a safety lock kit for mounting onto a conventional wheelchair.

FIG. 5 shows a kit 200 for use to add a safety lock assembly 100 to a conventional wheelchair 10. Kit 200 includes a safety handle 110, a link 120, a stationary rod 130, a mounting plate 140 including threaded holes 142, screws 144, a nut 150, and a bolt 152. Preferably, kit 200 includes two of each of the items listed above, such that safety lock assembly 100 includes a safety handle 110 for each wheel 38 of wheelchair 10. In order to assemble kit 200 to wheelchair 10, mounting plate 140 is coupled to wheelchair 10 using screws 144 through threaded holes 142. Stationary rod 130 is coupled to mounting plate 140. Many different ways can be used to couple stationary rod 130 to mounting plate 140. Screws or other coupling devices can be used. In the alternative, stationary rod 130 can be provided as one piece with mounting plate 140 as part of kit 200, for example, by welding stationary rod 130 to mounting plate 140. Other coupling techniques could also be used, as would be understood by one of ordinary skill in the art. Safety handle 110 can then be coupled to stationary rod 130, preferably through a hole or loop 114 provided in an extension 112 of safety handle 110, as described above. Further, safety handle 110 can be coupled to link 120, preferably by engaging a threaded end 116 of safety handle 110 with a hole or loop 122 in an end of link 120. Link 120 is also coupled to brake handle 52 of wheelchair 10. This connection may require drilling a hole 64 in brake handle 52, inserting bolt 152 through hole 64, through a hole 124 in the other end of link 120, and tightening nut 150 onto bolt 152. Link 120 is preferably adjustable in length such that kit 200 can be added to wheelchairs with different dimensions or different locations of brake handle 52. Link 24 is adjustable due to its construction, including a rod 121, preferably hollow, and adjustable threaded ends 126, 128. Holes or loops 122, 124 are part of threaded ends 126, 128. Accordingly, by turning threaded ends 126,128 relative to rod 121, link 120 may be lengthened or shortened, depending on the configuration of wheelchair 10.

While the invention has been particularly shown and described with reference to preferred embodiments thereof, it will be understood by those skilled in the art that various changes in form and details may be made therein without departing from the spirit and scope of the invention.

What is claimed is:

1. A safety lock for a wheelchair having a frame, a seat mounted to the frame and wheels coupled to the frame, comprising:

a brake mounted to the frame for engaging and disengaging a tire of the wheelchair; and a safety handle coupled to said brake for engaging and disengaging said brake, said safety handle being movably mounted to the frame of the wheelchair and normally disposed in a first position to lie spaced from and substantially across at least a portion of the seat to thereby prevent access to the seat, said safety handle being movable to a second position away from the seat to thereby permit access to the seat, wherein when said safety handle is disposed in said second position, said handle causes said brake to engage the tire of the wheelchair, and when said handle is disposed in said first position, said brake is disengaged from the tire.

2. The safety lock of claim 1, wherein in said first position, said safety handle is in front of a person seated in the wheelchair and wherein in said second position, said safety handle is moved such that it is not in front of the person seated the wheelchair.

3. The safety lock of claim 1, wherein said safety handle is coupled to said brake by a link.

4. The safety lock of claim 1, wherein said safety handle is coupled to the wheelchair through a rod and a mounting plate.

5. The safety lock of claim 4, wherein said safety handle rotates about said rod.

6. A kit for mounting to a brake of a wheelchair comprising:

a safety handle; and linkage for coupling said safety handle to the brake of the wheelchair, wherein said safety handle is coupled to the brake such that in order for a person in the wheelchair to get out of the wheelchair, said safety handle must be moved such that the brake engages against a tire of the wheelchair.

7. The kit of claim 6, wherein said safety handle is coupled to the brake of the wheelchair such that the brake is disengaged when said safety handle is in front of a person seated in the wheelchair and the brake is engaged when said safety handle is moved such that it is not in front of the person in the wheelchair.

8. The kit of claim 6, wherein said safety handle is coupled to the brake of the wheelchair by a link.

9. The kit of claim 6, wherein said safety handle is coupled to the wheelchair through a rod and a mounting plate.

10. The kit of claim 9, wherein said safety handle rotates about said rod.

* * * * *